United States Patent [19]
Bennett

[11] 3,871,375
[45] Mar. 18, 1975

[54] UNITARY MOLDED SWABS
[76] Inventor: Robert A. Bennett, Sturbridge Rd., Easton, Conn. 06425
[22] Filed: Aug. 30, 1973
[21] Appl. No.: 393,074

[52] U.S. Cl. .................................. 128/269, 161/7
[51] Int. Cl. ............................ 464 54, A61m 35/00
[58] Field of Search .......... 161/7; 128/269; 264/54; 15/104.17

[56] References Cited
UNITED STATES PATENTS
2,842,790  7/1958  Castelli .............................. 128/269
3,818,911  6/1974  Fournier ............................ 128/269
FOREIGN PATENTS OR APPLICATIONS
1,190,733  5/1970  United Kingdom ................ 128/269

Primary Examiner—William E. Schulz
Attorney, Agent, or Firm—Mattern, Ware & Davis

[57] ABSTRACT

A molded, unitary, double-ended swab formed of resilient polymer foam material has soft, porous, ellipsoidal ends with open cavities exposed on their external surfaces at each end of the swab, joined by a less resilient central shaft portion having a more dense and less porous cellular structure. The unitary swabs of this invention are molded in multiple-cavity injection molds incorporating selective heating passages and cooling passages positioned to produce the desired degree of porosity in the separate portions of each swab.

3 Claims, 6 Drawing Figures

PATENTED MAR 18 1975   3,871,375

UNITARY MOLDED SWABS

This invention relates to double-ended swabs for cleaning of patients' ears or noses, for the application of medication to body surfaces, and for use as applicators and the like, and particularly to soft-tipped resilient, sterile double-ended swabs molded as unitary foam injection molded particles in multiple cavity injection molds.

BACKGROUND OF THE INVENTION

PRIOR ART

Conventional double-ended swabs have many disadvantages. They require either a wooden or plastic stick or a rolled paper shaft for the central handle portion, requiring fabrication or handling steps of various kinds even before the swab tips can be applied to their ends.

Wooden shafts must be shaped and cut; plastic shafts must be extruded. Rolled paper shafts must be cut, rolled and glued to form the desired elongated shaft or handle portion of the swabs. Thereafter, each handle portion is conventionally fed through a hopper to a drum which exposes its ends to separate bodies of fibrous cotton and the shafts are rolled or rotated through the bodies of cotton fibers to adhere and wind bits of cotton on each end of each shaft portion, forming the desired ellipsoidal shape in a spinning mold, which tends to compress the cotton ends as the dual-ended swab is finished. Even when automatic machinery is used for the fabrication of these products the shaft hoppers and the cotton hoppers must be constantly filled and checked by attendants, and exorbitant labor costs are therefore involved in the production of these products.

SUMMARY OF THE INVENTION

These disadvantages are eliminated by the products and the methods of the present invention, which achieve nearly complete automation of the fabrication process, drastically reducing the number of personnel required for production of these articles.

As a result, the products of the present invention are one-piece "unitary" molded articles with extremely low material costs and production costs. In addition, these unitary articles have the required soft, resilient, absorbent tips formed of soft polymer foam at each end, joined by an integral central shaft of the same polymer foam material with finer porosity and less resilience than the soft foam tips, providing the desired degree of structural stiffness while assuring that the shaft will bend rather than injure the patient if endwise pressure should be applied.

One unexpected advantage of the swabs of the present invention is the result of the blended region joining the central shaft to the soft, resilient, absorbent tips. Since the blended region merges gradually from the low porosity and slightly more rigid shaft portion to the high porosity and softly resilient tip portion, there is no sharp-ended "stick" presented to the patient's body. Instead a blunt, gradually-softening region is provided, assuring that stabs, punctures and similar injuries cannot be produced by the products of this invention.

Accordingly a principal object of the invention is to provide unusually economical injection molding methods and apparatus for the production of double-ended swabs.

Another object of the invention is to provide such unitary swabs formed of polymer foam material having a low porosity in a central shaft portion and higher porosity in a soft resilient tip portion formed at each end thereof.

A further object of the invention is to provide such unitary molded foam swabs having a merging region of gradually increasing softness extending from the shaft portion into the tip portion, producing in effect a soft, blunt deformable object having no sharp-ended central shaft.

Still another object of the invention is to provide such double-ended swabs formed of unitary polymer foam material having open cellular cavities exposed around the outer surface of their soft resilient tip portions to facilitate the application of medication, the removal of ear wax, and all of the other uses for which swabs are normally employed.

Other and more specific objects will be apparent from the features, elements, combinations and operating procedures disclosed in the following detailed description and shown in the drawings.

THE DRAWINGS

Figure 2:
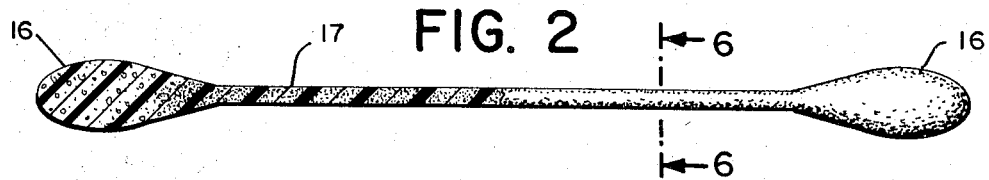
FIG. 2 is a side elevation view, partially in axial cross-section, showing a unitary molded double-ended swab of foam polymer material formed by the methods and apparatus of this invention.
Figure 3:
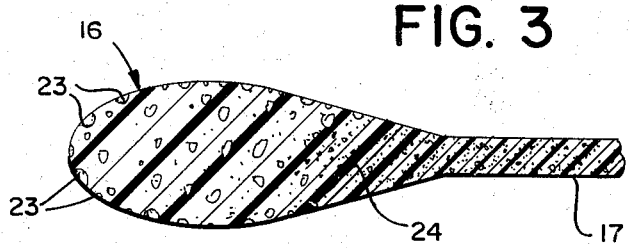
FIG. 3 is an enlarged fragmentary axial cross-sectional view of one end of the article shown in FIG. 2, illustrating its soft tip, its more rigid shaft and the blended porosity region joining these two portions of the article.
Figure 6:
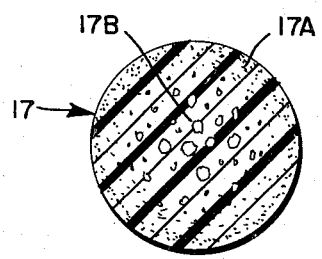
Figure 4:
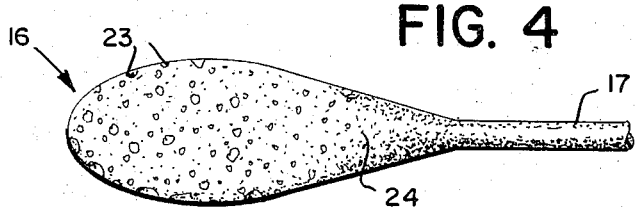
FIG. 4 is an enlarged fragmentary side elevation view of the portion of the molded article shown in FIG. 3, illustrating the open cellular cavities formed on the outer surface of its soft end portion, as compared to the smaller foam cavities on the surface of its harder shaft.
Figure 5:
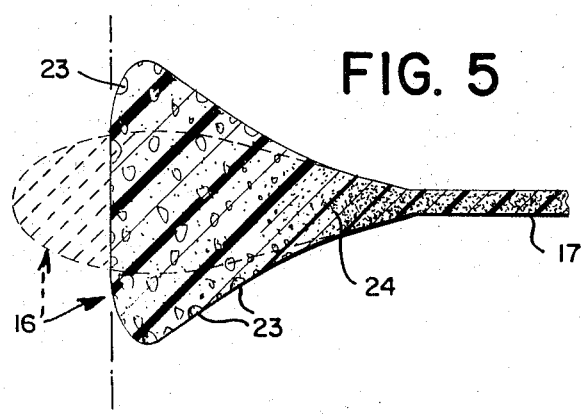

FIG. 5 is an enlarged fragmentary axial cross-sectional view corresponding to FIG. 3 showing the soft tip portion of the swab deformed, as by the pressure of applying it to a patient's body, illustrating the flattened shape of the soft tip produced by such pressure, enlarging the effective area and spreading the force applied by the tip and avoiding its concentration in a small central area, and thereby producing a significant safety advantage for these products, and FIG. 6 is a transverse cross-sectional view of the shaft portion of the same article, greatly enlarged, taken along the plane 6—6 of FIG. 2.

DETAILED DESCRIPTION OF THE INVENTION

Figure 1:
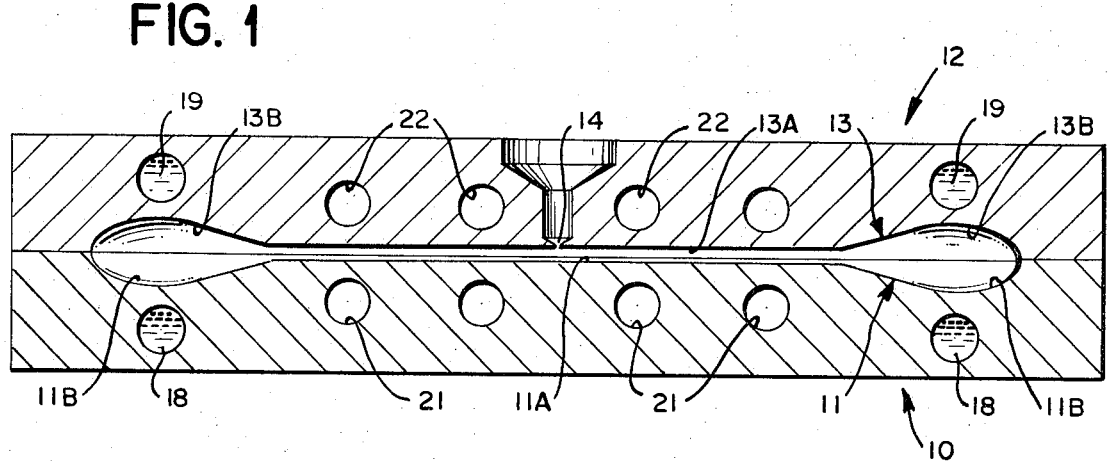
FIG. 1 is a transverse cross-sectional view of a two-part injection mold employed in the processes of the present invention.

In the two-part injection mold shown in FIG. 1, the base 10 is provided with a concave molding cavity 11 and the top 12 is provided with a corresponding molding cavity 13. The two mating molding cavities 11 and 13 are formed to produce the axially-symmetrical molded article shown in FIG. 2, having enlarged tips connected by a central shaft portion of smaller diameter. While axial symmetry is not essential, it is normally preferred for convenient use and for entry into ear canals or nostrils of patients, for example.

The shaft portion 11A of the molding cavity 11 and the corresponding shaft portion 13A of the molding cavity 13 thus produce the central handle or shaft portion of the resulting product, while the enlarged, semiellipsoidal portions 11B and 13B of the two molding cavities produce the enlarged tips of the double-ended swab product shown in FIG. 2.

A "submarine" gate is provided for the introduction of the foamable polymer injection molding material through a small-diameter injection nozzle aperture 14 into the mating mold cavity 11–13 at a central portion of the upper shaft cavity 13A. This "submarine" gate assures that the molded article can be easily separated from any "flash" or gate material left at the gate portion of the molded article when it is removed from the mold.

With conventional foam polymer such as polyurethane formed in the molds of this invention, these molds may be formed from hobbed aluminum blocks for significant economy of fabrication. Expensive machined steel molds are not ordinarily required for this purpose.

In order to achieve the desired contrasting porosity differences in the unitary molded articles of this invention, producing soft resilient tips 16 and a less porous, more dense central shaft portion 17, as shown in FIG. 2, the molds of this invention are provided with heating passages 18 and 19 in the base and top mold portions 10 and 12 respectively. These heating passages are positioned close to the enlarged semiellipsoidal tip cavity portions 11B and 13B. These heating passages 18 and 19 are normally filled with hot water at about 200°F., for example, although other heat exchange media may be used if desired to achieve higher temperatures, above 212°F. By varying the temperature of the heat exchange medium in the passages 18 and 19, the degree of porosity and the resulting softness of the tip portions 16 may be changed as desired.

The central portion of the mold blocks 10 and 12 adjacent to the semi-cylindrical, reduced-diameter shaft cavities 11A and 13A is provided with cooling passages 21 and 22, formed respectively in the base 10 and top 12. These cooling passages 21 and 22 are normally filled with coolant at room temperature, for example, assuring that the central portion 17 of the molded article will not have the large-cell, soft, resilient character achieved in its tip portions 16.

Instead, as shown in FIGS. 2, 3 and 5, the central portion 17 will have very fine porosity, and the degree of porosity and the size of the tiny cells formed in this portion 17 may be varied to give the desired degree of stiffness or bendability in the shaft portion 17, merely by changing the coolant temperature in the passages 21 and 22 in the central portions of the mold blocks 10 and 12.

In one embodiment of the invention, where the coolant temperatures are approximately at room temperature, the resulting article formed in these injection molds has almost no porosity in the peripheral surface region 17A of its shaft portion 17. As a result, while the central core portion 17B of shaft 17 has fine porosity and considerable resilience, the outer skin of shaft 17 will be formed as a rigidifying tubular sleeve 17A surrounding that central foam core portion 17B, for desirable flexibility of the shaft portion 17, as shown in FIG. 6.

Single ended swabs having only one enlarged, soft, resilient tip 16 may be formed if desired, if the mold cavities 11–13 are correspondingly altered as desired.

The open cells formed in the surface of tip 16 provide concave cavities 23 serving to carry lubricant, medication or other liquid, to collect ear wax, and otherwise to perform the same functions performed by the porous interstices between the fibers of conventional cotton-tipped swabs.

A significant and unexpected advantage of the invention is provided by the intermediate portion 24 of the molded polymer foam swabs. Intermediate portion 24 forms a blended or merged zone of progressively diminishing density and increasing cell-size and porosity extending from shaft portion 17 into the softer tip portion 16. As shown in FIG. 5, the flaring and progressively softer intermediate region 23 avoids any "sharp-ended stick" effect, and facilitates the blunt flattening deformation of tip 16 in response to endwise compression loads, such as those imposed by inadvertent jabbing of a patient. As a result, punctured eardrums and inadvertent "stab" wounds cannot be caused by the swabs of this invention.

In one preferred form of the present invention, a large plurality of molds are employed having the form shown in the cross section FIG. 1. These molds are arrayed on a slowly rotating turntable forming the device sometimes called a "rotary mold," and a continuous process of mold-closing, preheating, filling, mold-opening and air-ejecting the molded articles is performed as the various portions of the turntable travel around the periphery of the supporting base.

By this means, the closing and preheating of the molds may be performed at a preheating sector region at one point on the base periphery; the filling may be performed at an injection station on the base periphery; the required molding time inside the closed molds is achieved merely by the residence time of the injected material inside the molds as they travel around the predetermined residence sector of the base periphery, and the opening and air-ejection of the molded articles occurs at a delivery station adjacent to a hopper into which the final product is delivered by automatic means. Depending upon the size of the molds, the number of multiple cavities incorporated in each mold set and the overall size of such a rotary mold apparatus, as many as ten thousand or more injection molded articles may be formed per minute by such devices.

Polymer Molding Materials

Many different foamable polymers may be formed into the articles of the present invention using the foregoing methods and apparatus, and materials of white, yellow, blue or any desired color may be selected as desired for the production of sterile, sanitary double-ended swabs having soft resilient tips and flexible central shaft portions. A typical preferred composition of molding material is that specified in the following Example I:

EXAMPLE I

| 100 parts | Polyol resin hydroxyl No. 56 molecular weight of 3,000 (e.g., Union Carbide's L.G 56) Reacted with |
| 50 parts | Toluene Di-isocyanate |
| 2.8 parts | water catalysts: Houdry Chemico |
| 0.5 parts | "DABCO", triethylene diamene, and |
| 0.2 parts | Stannous octoate |

The preferred composition given in Example I may be varied slightly by changing the water content and utilizing other catalysts or changing the amount of the preferred catalysts specified, providing desired variations in the toughness, softness and flexibility of the resulting products. For example, from 2 to 4 parts of water may be used; the triethylene diamine may range from 0.25 part to 1.00 part; and the stannous octoate may range from 0.1 part to 0.4 part.

Since the foregoing description and drawings are merely illustrative, the scope of the invention has been broadly stated herein and it should be liberally interpreted to secure the benefit of all equivalents to which the invention is fairly entitled.

What is claimed is:

1. A unitary molded polymer foam article formed in the shape of a swab having an elongated dense shaft holding means portion of fine-celled porosity and an enlarged working tip portion of coarse-celled porosity less dense and more deformably resilient than said shaft portion.

2. The swab defined in claim 1 wherein each end of the fine-celled shaft is provided with a less dense and more resilient tip portion.

3. The swab defined in claim 1 wherein the shaft portion is joined to the tip portion by an intermediate portion of progressively increasing cell-size ranging from the fine cell size of the shaft portion to the coarse cell size of the tip portion, providing a diverging stress-transmitting and load-spreading region.

* * * * *